Feb. 9, 1965  B. D. SPOONER  3,169,036
INFANT'S CAR SEAT SUPPORT
Filed Jan. 8, 1963

INVENTOR.
B. Dale Spooner.
BY John Cyril Malloy
Attorney.

3,169,036
INFANT'S CAR SEAT SUPPORT
Bertice Dale Spooner, Miami, Fla.
(1051 NE. 11th Ave., Gainesville, Fla.)
Filed Jan. 8, 1963, Ser. No. 250,086
5 Claims. (Cl. 297—256)

This invention relates to a support for small children which is adapted to be mounted to a vehicle seat, and, more particularly, to a support which is intended to give a relatively large degree of freedom to children and, at the same time, support a child on the front seat of a car.

As is well known, there are numerous vehicle seats for children which are adapted to be hung over vehicle seats; however, it is often difficult to keep children in such seats since they seek a greater degree of freedom. The instant invention is related to the prior art seats in that it is adapted to be hung over a vehicle seat. Additionally, it includes means whereby a child may alternatively stand or sit on the front seat.

Accordingly, it is an object of this invention to provide a support for small children which is adapted to be mounted to a vehicle seat and which restrains small children while simultaneously permitting a relatively large degree of freedom.

It is another object of this invention to provide an infant's support for hanging over the back of a vehicle seat which includes means for fastening it to the seat and a pair of slideable rings mounted on projections of the support, said rings being adapted to be fastened to a child's harness, whereby a child may stand or sit on the seat while at the same time being restrained to a definite area of the seat.

It is also an object of this invention to provide an infant's seat as set forth hereinafter which includes a platform pivotally mounted thereto on which a child may sit.

It is a general object of this invention to provide an infant's car seat support which is strong and durable, relatively inexpensive to manufacture and otherwise well adapted for the purposes for which it is intended.

In accordance with these and other objects which will become apparent hereinafter, the instant invention will now be described with reference to the accompanying drawings illustrating a preferred embodiment thereof.

Figure 1:
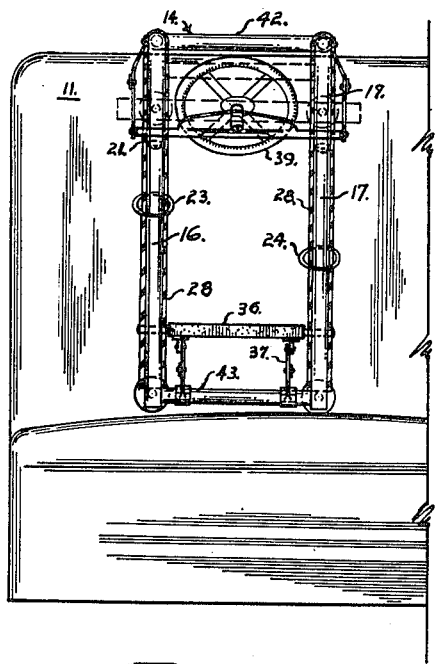
FIG. 1 is a partial front elevation view of a vehicle seat and illustrating the instant infant's seat support.

Referring more particularly to the drawings, wherein like reference characters designate like or corresponding parts throughout the several views, the numeral 11 represents a vehicle seat back with the front face thereof being designated by the numeral 12 and the back face by the numeral 13. A U-shaped hook-form member 14, which is bent back upon itself forming a pair of downwardly extending legs 16 and 17 and a downwardly extending closed end 18 is illustrated hung over the seat back. Intermediate the downwardly extending legs and closed ends, a pair of downwardly extending fingers or members 19 and 21 are provided, said members being fastened to the U-shaped member as at 22 and normally overlaying the front face 12 of the seat back 11. On each leg 16 and 17, rings 23 and 24 are slidably mounted, said rings being adapted to be connected to a child's harness, indicated in dotted lines and designated 26. The legs, 16 and 17, may be provided each with a stop 26 to limit downward travel of the rings, including a foot 27 for abutting engagement with the lower surface of the front face of the seat back. The legs may also be covered with a suitable decorative fabric sleeve 28, or a cushion sleeve. Transversed connecting members 42 and 43 may be provided to strengthen the support.

Figure 2:
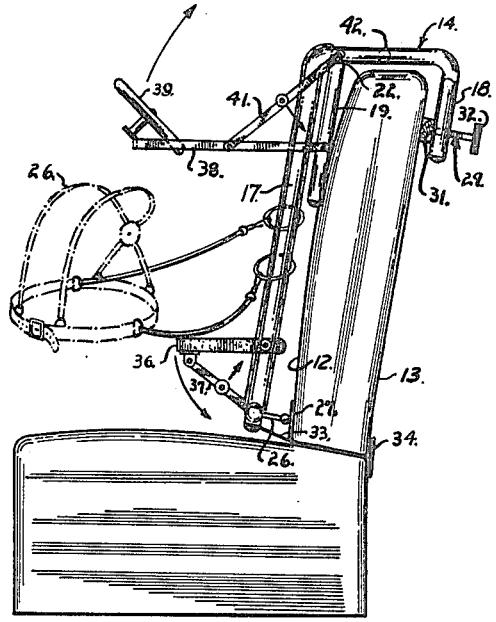
FIG. 2 is a side elevational view illustrating the instant infant's seat support.
Figure 3:
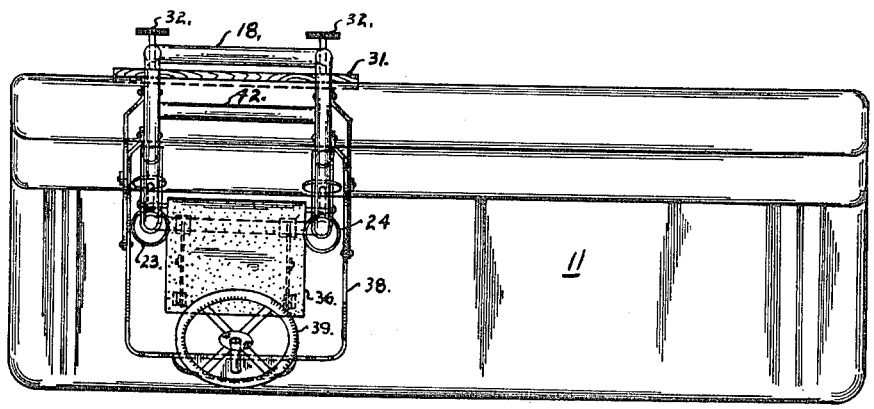
FIG. 3 is a top plan view of the instant infant's seat support mounted to a vehicle seat.

In use, the support is hung over a vehicle seat back, as indicated, and fastened thereto by a rear clamping means 29. The support normally embraces the top of the seat back between the closed end 18 and the members 19, with the clamping means which may include a transverse board 31 and a tightening screw 32 being adapted to be threaded inwardly or outwardly causing the seat back to be clamped more or less tightly. To further fasten the support to the seat back, lines such as that designated 33 in FIGURE 2 may be fastened adjacent the lower ends of the legs at one end with the other end of the line being threaded through the seat back with a button 34 fastened thereto.

The support may be provided with a pivotally mounted platform 36 fastened to the lower end of the legs and supported by a collapsible mechanism 37. Also, the support may be provided with a curved outwardly extending member 38 fastened to the upper end of the members 19 and 21, said support having a simulated driving wheel 39 fastened thereto and being supported when in use by a collapsible mechanism 41, in the form of a jack-knifing strut.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An infant's support adapted to be hung over the back of a vehicle seat comprising: a U-shaped, tubular member bent back upon itself forming a spaced apart pair of downwardly extending legs and a downwardly extending closed end, said U-shaped member being adapted to be hung over a vehicle seat back with said legs extending downwardly over the front face of a seat back and the closed end extending downwardly along the back surface; a pair of downwardly extending fingers, each fastened to said U-shaped member intermediate a leg and said closed end, said fingers being short in comparison to said legs, and adapted to extend in overlying relation to the front face of a vehicle seat back maintaining said legs in spaced relation therefrom; a ring slidably mounted to each of said legs for connecting a child's harness thereto; and means including a tightening screw adjustable on the closed end of said U-shaped member to cooperate with said downwardly extending fingers for clamping said U-shaped member to a seat back.

2. An infant's support adapted to be hung over the back of a vehicle seat as set forth in claim 1 comprising a strap fastened to the downwardly extending legs adapted to be fastened to a vehicle seat.

3. An infant's seat support adapted to be hung over a vehicle seat back as set forth in claim 1 comprising a horizontal support platform fastened adjacent the ends of said legs.

4. An infant's seat support adapted to be hung over a vehicle seat back as set forth in claim 3 wherein said platform is pivotally mounted to said legs and adapted to be aligned with said legs.

5. An infant's seat support adapted to be hung over a vehicle seat back as set forth in claim 4 wherein said fingers are provided with an adjustable outwardly extending closed member having a rotatable wheel mounted thereto whereby a child may grasp said member for support.

References Cited by the Examiner
UNITED STATES PATENTS

| | | | |
|---|---|---|---|
| 937,650 | 10/09 | Scott | 297—256 |
| 1,351,746 | 9/20 | Eberle | 297—255 |
| 1,447,302 | 3/23 | Gugler | 297—254 |
| 2,774,411 | 12/56 | Berlin | 297—385 |
| 2,799,322 | 7/57 | Jordan | 297—254 |
| 2,802,906 | 8/57 | Goldenberg | 297—256 |
| 2,803,468 | 8/57 | Thompson | 297—254 |
| 2,848,936 | 8/58 | Campbell | 297—253 |
| 2,877,833 | 3/59 | Boles | 297—389 |

FOREIGN PATENTS

| | | |
|---|---|---|
| 207,664 | 1/57 | Australia. |
| 71,014 | 4/15 | Switzerland. |

FRANK B. SHERRY, *Primary Examiner*.